(12) United States Patent
Sim et al.

(10) Patent No.: US 8,040,885 B2
(45) Date of Patent: Oct. 18, 2011

(54) WIRELESS NETWORK SYSTEM AND COMMUNICATION METHOD IN A WIRELESS NETWORK

(75) Inventors: Dong Hi Sim, Seoul (KR); Ji Young Huh, Gyeonggi-do (KR); Jae Young Lee, Gyeonggi-do (KR); Sook Hyun Yang, Seoul (KR); Yong Ho Seok, Seoul (KR)

(73) Assignee: LG Electronics Inc., Seoul (KR)

( * ) Notice: Subject to any disclaimer, the term of this patent is extended or adjusted under 35 U.S.C. 154(b) by 649 days.

(21) Appl. No.: 11/873,704

(22) Filed: Oct. 17, 2007

(65) Prior Publication Data

US 2008/0219192 A1 Sep. 11, 2008

(30) Foreign Application Priority Data

Mar. 10, 2007 (KR) .................. 10-2007-0023780

(51) Int. Cl.
*H04L 12/28* (2006.01)

(52) U.S. Cl. ...................................... 370/390; 370/406
(58) Field of Classification Search .................. None
See application file for complete search history.

(56) References Cited

U.S. PATENT DOCUMENTS

| | | |
|---|---|---|
| 2005/0078676 A1 | 4/2005 | Bae et al. |
| 2005/0245215 A1 | 11/2005 | Abhishek et al. |
| 2006/0062183 A1* | 3/2006 | Forte et al. ............ 370/331 |
| 2006/0080517 A1* | 4/2006 | Brown ................. 711/163 |
| 2006/0126533 A1 | 6/2006 | Wang |
| 2008/0049703 A1* | 2/2008 | Kneckt et al. ......... 370/342 |
| 2008/0123577 A1* | 5/2008 | Jaakkola et al. ....... 370/311 |
| 2008/0151814 A1* | 6/2008 | Jokela .................. 370/328 |

* cited by examiner

*Primary Examiner* — Robert Scheibel
*Assistant Examiner* — Eunsook Choi
(74) *Attorney, Agent, or Firm* — Lee, Hong, Degerman, Kang & Waimey

(57) ABSTRACT

Disclosed is a wireless network system and a method for transmitting and receiving various information and data related to broadcast or multicast services in a wireless network.

5 Claims, 5 Drawing Sheets

WIRELESS NETWORK SYSTEM AND COMMUNICATION METHOD IN A WIRELESS NETWORK

CROSS-REFERENCE TO RELATED APPLICATIONS

The present application claims priority from Korean Patent Application No. 10-2007-0023780, filed in Korea on Mar. 10, 2007, the entire contents of each is incorporated herein by reference.

BACKGROUND

1. Field of the Invention

The present invention relates to a wireless network system and a method for sending and receiving various information and data related to broadcast or multicast services in a wireless network.

2. Description of the Related Art

Recently, with the rapid spread of a wireless network environment, various broadcast or multicast services have been served by a wireless network.

SUMMARY

Accordingly, an object of the present invention is to provide a wireless network system and a method for sending and receiving various information and data related to broadcast or multicast services in a wireless network.

According to one aspect of the present invention, there is provided a method of performing FBMS operation for an access point in a wireless communication system, the method comprising: receiving, from the station with which it is associated, a FBMS request containing one or more FBMS element which comprises at least delivery interval field; and transmitting to the station a FBMS response containing one or more FBMS element with FBMS counter field.

The FBMS counter field comprises both FBMS counter ID and current count.

The FBMS element of the FBMS response further comprises one or more of Delivery Interval, FBMSID, FBMS Counter, Multicast Rate, Multicast Address, Multicast Diagnostic Interval fields along with the FBMS Element status field.

According to another aspect of the present invention, there is provided a method of performing FBMS operation for a station in a wireless communication system, the method comprising: transmitting, to an access point with which it is associated, a FBMS request containing one or more FBMS element which comprises at least delivery interval field; and receiving, from the access point, a FBMS response containing one or more FBMS element with FBMS counter field.

The FBMS counter field comprises both FBMS counter ID and current count.

The FBMS element of the FBMS response further comprises one or more of Delivery Interval, FBMSID FBMS Counter, Multicast Rate, Multicast Address, Multicast Diagnostic Interval fields along with the FBMS Element status field.

According to still another aspect of the present invention, there is provided an access point for performing FBMS operation in a wireless communication system, the method comprising: a receiving means for receiving, from the station with which it is associated, a FBMS request containing one or more FBMS element which comprises at least delivery interval field; and a transmitting means for transmitting to the station a FBMS response containing one or more FBMS element with FBMS counter field.

The FBMS counter field comprises both FBMS counter ID and current count.

The FBMS element of the FBMS response further comprises one or more of Delivery Interval, FBMSID, FBMS Counter, Multicast Rate, Multicast Address, Multicast Diagnostic Interval fields along with the FBMS Element status field.

According to still another aspect of the present invention, there is provided a station for performing FBMS operation in a wireless communication system, the method comprising: a transmitting means for transmitting, to an access point with which it is associated, a FBMS request containing one or more FBMS element which comprises at least delivery interval field; and a transmitting means for receiving, from the access point, a FBMS response containing one or more FBMS element with FBMS counter field.

The FBMS counter field comprises both FBMS counter ID and current count.

The FBMS element of the FBMS response further comprises one or more of Delivery Interval, FBMSID FBMS Counter, Multicast Rate, Multicast Address, Multicast Diagnostic Interval fields along with the FBMS Element status field.

BRIEF DESCRIPTION OF THE DRAWINGS

The above aspects of the present invention will be more apparent by describing certain exemplary embodiments of the present invention with reference to the accompanying drawings, in which:

FIG. 2 is a procedure diagram illustrating a combination operation for transmitting data in a wireless RAN shown in FIG. 1a;

DETAILED DESCRIPTION

Hereafter, embodiments of the present invention will be explained in detail with reference to the accompanying drawings. Further, a wireless RAN system among wireless network systems will be explained as one example of the embodiments of the present invention.

However, the embodiments of the present invention may be applied to the wireless RAN system as well as various wireless network systems. Terms or words used for the embodiments of the present invention may be used as different terms or words in the various wireless network systems. Accordingly, if practicable meanings of the terms or words are the same or similar, the terms or words are regarded as the same.

Figure 1A:
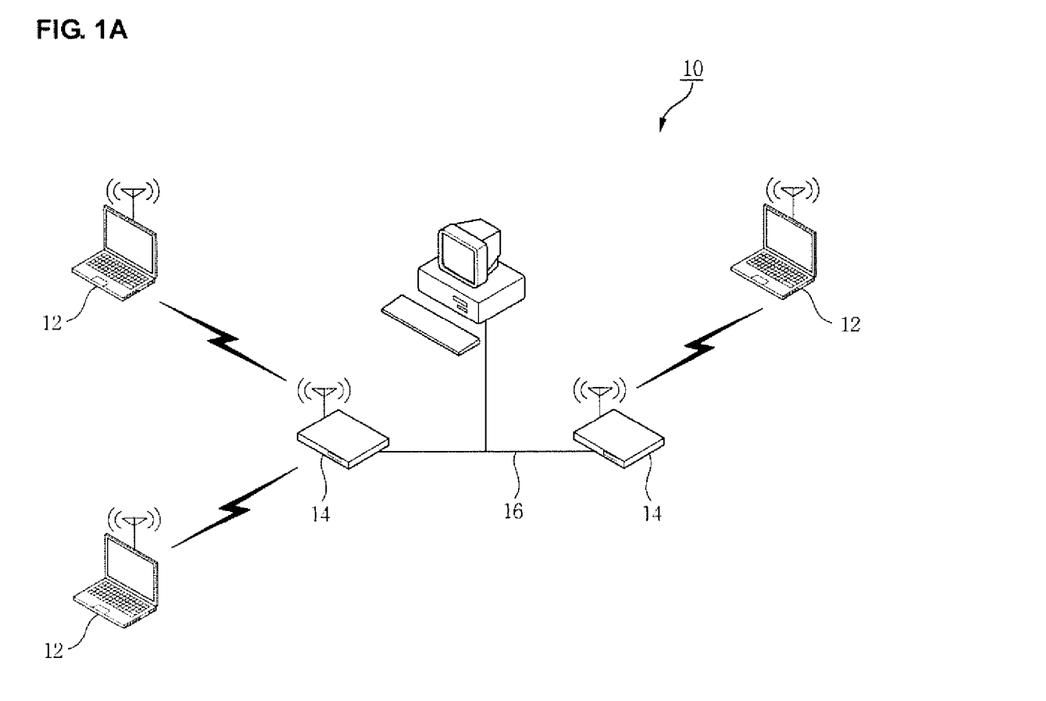
FIGS. 1a and 1b are a concept diagram illustrating a wireless network system according to an exemplary embodiment of the present invention.
Figure 1B:
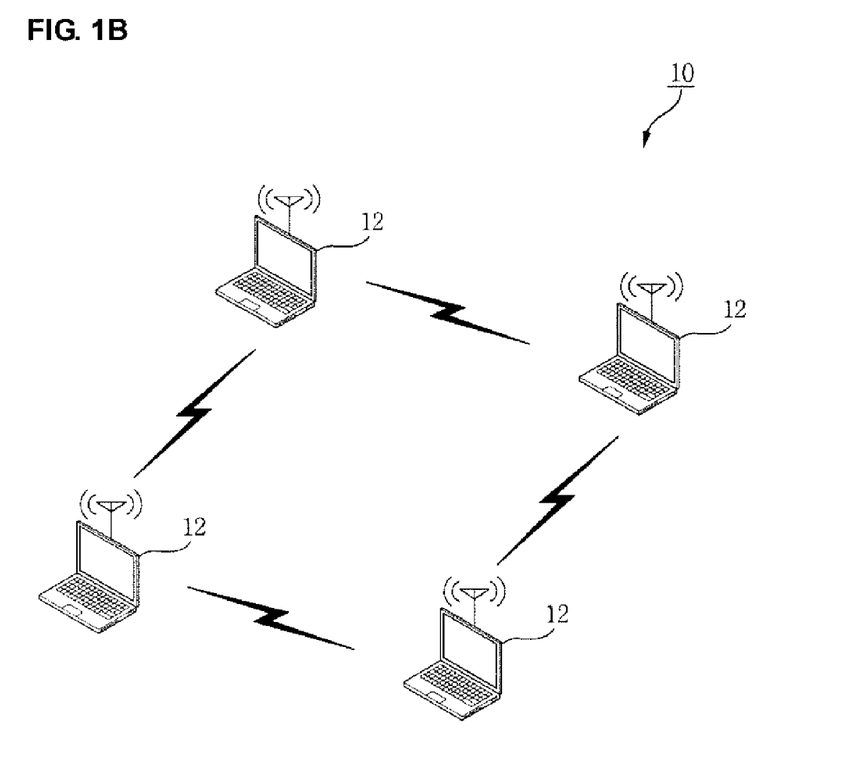

FIGS. 1a and 1b are a concept diagram illustrating a wireless network system according to an exemplary embodiment of the present invention. The same constituent elements of FIGS. 1a and 1b use the same drawing number.

Referring to FIG. 1a, a wireless network system, for example, a wireless RAN system 10 includes a plurality of stations or terminals 12, an access point or wireless base station 14 and a backbone network or a distribution system 16.

The plurality of stations 12 mounts a network interface card for a wireless RAN to perform an operation of a physical layer and a MAC layer based on IEEE 802.11 standard. The plurality of stations 12 is connected to the access point 14 to transmit a data frame.

The access point 14 performs wire and wireless interworking bridge function for relaying a frame transmitted from one station to other station. The access point 14 performs the same function as a bridge or a switch of an Ethernet.

Further, the access point 14 basically includes the same the physical layer and MAC layer as the above described station 12. Thus, the access point 14 can basically perform the same operation as the station 12. As a result, the access point 14 can be regarded as the same as the station 14, if necessary.

The station 12 and/or the access point 14 which performs an FBMS operation in a wireless communication system, may comprise many kinds of means for performing a FBMS procedure.

The means for performing the FBMS procedure may be implemented by software, hardware or their combination in the station 12 or the access point 14. The means performs all or part of steps which comprise the FBMS procedure.

The distribution system 16 is a backbone network that connects the plurality of access points 14. The distribution system 16 usually uses the Ethernet, but may connect the plurality of access points 14 in wireless. The distribution system 16 may broadly include a router or a switch connected to the Ethernet, and a plurality of servers connected to a wire and wireless internet network.

Referring to FIG. 1b, the wireless network system, for example, the wireless RAN system 10 includes the plurality of stations or terminals 12. The wireless RAN system 10 is connected to point-to-point directly between stations 12. Accordingly, the wireless RAN system 10 shown in FIG. 1b does not include a separate access point 14 and the distribution system 16, differently from the wireless RAN system 10 of FIG. 1a. However, the plurality of stations 12 in the wireless RAN system 10 can perform functions of the separate access point 14 and the distribution system 16. Also, a part of functions of the separate access point 14 and the distribution system 16 may be omitted.

Although the wireless RAN system 10 is explained with reference to FIGS. 1a and 1b, the wireless network system including the wireless RAN system 10 according to one embodiment of the present invention is not limited thereto, and may be implemented with their combination or a separate system. The wireless network system according to one embodiment of the present invention can exist independently, and interwork between a different wireless network system, a mobile communication network and a wire and wireless internet network.

For example, the wireless RAN system can provide a roaming service by interworking with a wideband code division multiple access (WCDMA). Specially, when the wireless RAN system provide a voice service, a dual band dual mode (DBDM) terminal supporting both the wireless RAN and the WCDMA performs voice call on the mobile communication network and simultaneously perform seamless automatic roaming on the wireless RAN system.

The wireless RAN systems 10 shown in FIGS. 1a and 1b can transmit data via a connection process between the stations 12 or between the station 12 and the access point 14.

Connection Procedure

Figure 2:
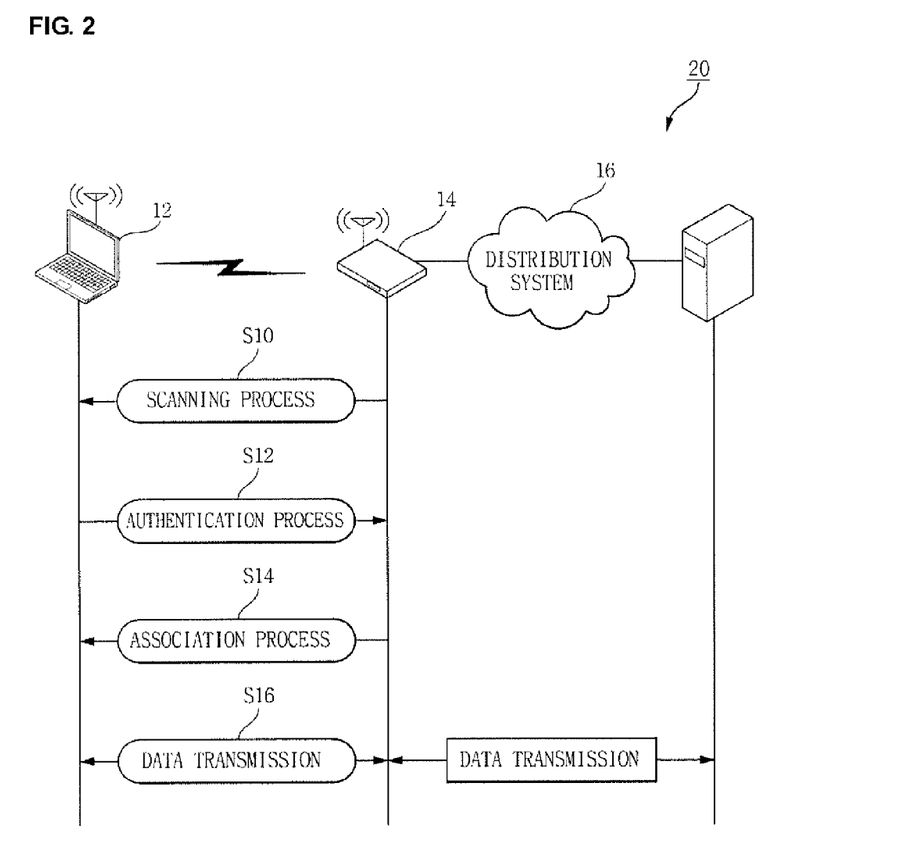

FIG. 2 is a procedure diagram illustrating a connection process for transmitting data in a wireless RAN system shown in FIG. 1a. The wireless RAN system and various wireless network system of FIG. 1b are partly different from those of FIG. 2. However, the wireless RAN system and various wireless network system of FIGS. 1b and 2 respectively include the connection process for transmitting the same data. Accordingly, the concrete explanation will be explained.

Referring to FIGS. 1a and 2, a connection process 20 for transmitting data between the station 12 and the access point 14 includes a scanning process S10, an authentication process S12, and a association process S14. The station 12 and the access point 14 perform a data transmitting process S16 via the processes S10, S12 and S14.

The scanning process S10 is a process for searching for neighboring access point 14 using a beacon message or probe message.

The scanning process S10 includes a passive scanning process for searching for the access point 14 from the beacon message where the access point 14 periodically broadcasts, and a active scanning process for enabling the station 12 to broadcast a probe request message or frame according to each channel and receive a probe response message including one's own service set ID (SSID), an operation speed, and others, from the access point 14, so as to select the corresponding access point 14. The beacon message includes various capabilities (speed, encryption, etc.) capable of being supplied by the access point 14 and one's own service group name (i.e. SSID).

The authentication process S12 verifies that the station 12 selecting the access point 14 in the scanning process S10 is effective terminal. In other words, the authentication process S12 is to negotiate the access point 14, an authentication procedure, and an encryption method. Mostly, an open system authentication method is used in the authentication process S12. Accordingly, the access point 14 unconditionally authenticates an authentication request from the station. A reinforced authentication method includes EAP-TLS, EAP-TTLS, EAP-FAST, PEAP, and others.

The association process S14 is a process that the station 12 connects to the access point 14, after completing successfully the authentication. The association process S14 means that an identical association is established between the station 12 and the access point 14. If the association process S14 is completed, the station 12 can communicate with other station 14 via the access point 14.

If the station 12 sends the association request message or frame to the access point 14, the association process S14 is performed by enabling the access point 14 to send an association response message including an association ID (AID) identified with other station.

The station 12 and access point 14 perform a data transmitting process S16 via the processes S10, S12 and S14.

The association process S14 is similar to a reassociation process. The reassociation process is to connect the access point associated with the station 12 to other access point. The reassociation process is to establish a new connection with new access point 14, when a signal from the access point 14 associated with the station 12 becomes weaker.

The frame being sent toward one station 12 is called unicast or directed data. The frames being sent toward one or more station 12 are called broad and multicast frame. The unicast frames is acknowledged to assure reliability. This means that various mechanisms can be used to improve efficiency.

The station 12 and the access point 14 comprise many kinds of means related to connection procedure. For example, The station 12 and the access point 14 comprises an authenticating means for performing an authentication procedure with another station. These means are implemented by software, hardware or their combination in the station 12 and the access point 14.

Broadcast and Multicast

The broadcast and multicast frames being sent toward one or more receiving station has the simplest frame exchange, because they are not acknowledged. Framing and addressing are a little complicate. Frame types matching with these rules include (1) broadcast data frames having a broadcast address in one address field, (2) multicast data frames having a multicast address in one address field, and (3) broadcast management frames (beacon, probe request, IBSS ATIM frames).

The frames toward group addresses may not be fragmented and also acknowledged. Entire sequence is sent to one frame according to a contention-based access control rule. After completing previous transmission, all stations 12 starts the countdown of a random delay interval on a contention window.

Since the frame exchange is a single frame sequence, NAV is set to "0". If the next frames are not continued, other stations do not need to lock the use of a medium using a virtual carrier-sense mechanism. After sending the frame, all stations wait for during DIFS, and start the countdown during the contention window in order to send next frames.

DTIM (Delivery Traffic Indication Map)

Since the frames having the group address are addressed to a group according to the definition, the frames can not be delivered using a poling algorithm. Accordingly, the frames have mechanisms for the broad and multicast frames. A buffering is the same as a unicast, except that the frames are buffered whenever the stations connected to the access point 14 are sleep. The buffered broad and multicast frames are stored using the AIDO. By setting a first bit of a traffic indication map (TIM), the access point 14 indicates which broadcast or multicast frames are buffered. The first bit corresponds to "AID 0".

Each BSS has a parameter such as a DTIM interval. The TIM is sent to all beacons. A specific type of the TIM, i.e., DTIM is sent during a fixed number of beacon intervals. A TIM element in the beacon frame includes a counter for performing the countdown until next DTIM. The counter becomes "0" in the DTIM frame. The buffered broad and multicast traffic is sent after the DTIM beacon.

The plurality of buffered frames is sequentially sent. Many data bits in a frame control field mean that many data should be sent. A channel acquisition rule is applied to the transmission of the buffered frames. The access point 14 can be selected to delay processing of incoming PS-Poll frames until the frames in the broad and multicast transmission buffers are transmitted.

Figure 3:
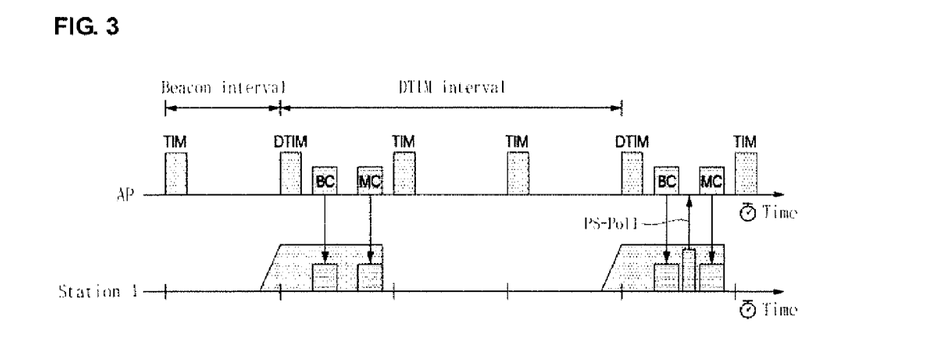
FIG. 3 is a diagram illustrating broadcast and multicast buffer transmission processes after a DTIM.

FIG. 3 is a diagram illustrating broadcast and multicast buffer transmission processes after a DTIM, between one access point and a solely connected station.

Since the DTIM interval of the access point 14 is set to "3", there is the DTIM every third TIM. The station is operated to a sleep mode having a listen interval of "3". To receive the buffered broad and multicast frames, the station will be waked up. After transmitting the DTIM frames, the PS-Poll exchange with the connected stations is performed and then the buffered broadcast and multicast frames will be transmitted.

For a second beacon interval, unique broadcast and multicast frames exist in the buffer and are sent to the BSS.

For a fifth beacon interval the frames are buffered for the station 12. After monitoring the map on the DTIM and deciding the transmission of the buffered broadcast and multicast frames, the PS-Poll is sent.

To receive the broad and multicast frames, the station 12 should be waked up during the transmission of the DTIM.

FBMS (Flexible Broadcast Multicast Service)

Figure 4:
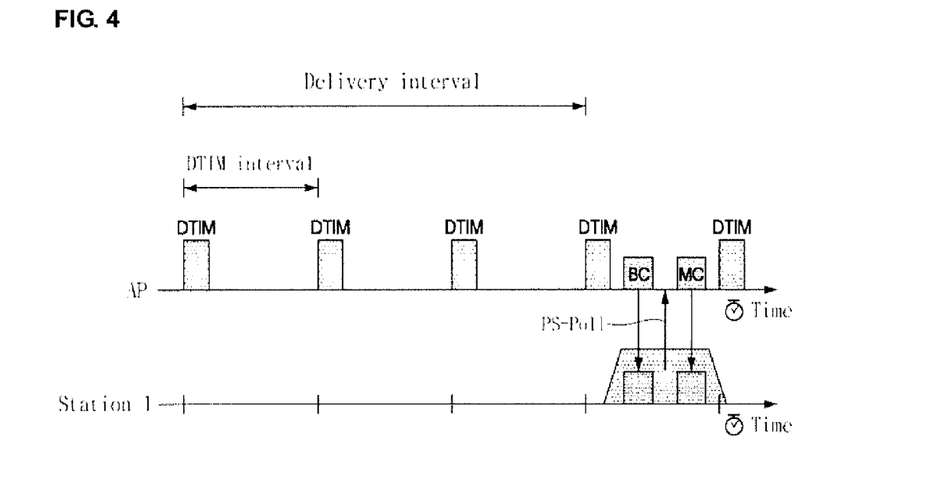
FIG. 4 is a diagram illustrating broadcast and multicast buffer transmission processes of a wireless network system supporting a flexible broadcast multicast service (FBMS)

FIG. 4 is a diagram illustrating broadcast and multicast buffer transmission processes of a wireless network system supporting a flexible broadcast multicast service (FBMS).

As described above, to reduce more consumption power than the transmission of the buffered broadcast and multicast frames after sending the DTIM frames, a delivery interval, which is an integer as many as the DTIM, is set every stream, and the buffered broadcast and multicast frames can be sent during the delivery interval set for each stream. Such a broad and multicast service is called the FBMS.

The wireless network system and a communication method thereof, according to one embodiment of the present invention, supplies the FBMS, because the access point 14 uses a wireless network management capability information element. Using the wireless network management capability information element, a non-access point station 12, which is trying to use the FBMS, can indicate that it desires to use the FBMS.

FBMS Request

The FBMS Request element defines information about the broadcast/multicast frames requested by the non-access point station (non-AP STA) 12. The format of the FBMS Request element is shown in a table 1.

TABLE 1

| | Element ID | Length | Multicast Element Count | FBMS Element 1 | FBMS Element n |
|---|---|---|---|---|---|
| Octets: | 1 | 1 | 1 | variable | Variable |

Referring to table 1, the Length field is set to 1+n, where n indicates the total length of all FBMS elements included in the elements.

The multicast element count indicates the number of the FBMS elements present.

The format of the FBMS sub-element is shown in table 2.

TABLE 2

| | TCLAS Element | Optional TCLAS Element | Optional TCLAS Element | Optional TCLAS Processing Element | Delivery Interval | Multicast Rate |
|---|---|---|---|---|---|---|
| Octets: | Variable | variable | variable | 3 | 1 | 1 |

Referring to table 2, a TCLAS information element defines a broadcast/multicast stream.

The plurality of selective TCLAS elements is allowed to classify the broadcast/multicast stream. The TCLAL processing element defines how multiple TCLAS elements are processed.

The delivery interval field defines the number of DTIMs that the stream is transmitted at. The default value is 1. The value set to "0" indicates that requesting non-access point station 12 does not use the FBMS element anymore.

The multicast rate field specifies the highest data rate at which the station 12 can reliably receive multicast frames. If no value is provided by the station 12, this field is set to "0".

FBMS Response

The FBMS Response element defines information about the broadcast/multicast status. The format of the FBMS Response element is shown in Table 3.

TABLE 3

| | Element ID | Length | FBMS Status Element 1 | FBMS Status Element n |
|---|---|---|---|---|
| Octets: | 1 | 1 | 5 | 5 |

Referring to table 3, the length field is set to 1+n, where n indicates the total length of all FBMS elements included in the elements. The format of the FBMS status element is shown in Table 4.

TABLE 4

| | Element Status | Delivery Interval | Element Reason Code | FBMS ID | FBMS Counter n | Multicast Rate | Multicast Address | Multicast Diagnostic Interval |
|---|---|---|---|---|---|---|---|---|
| Octets: | 1 | 1 | 1 | 1 | 1 | 1 | 6 | 4 |

Referring to Table 4, the element status field indicates the status of the access point responding to the delivery interval requested by the station, as indicated in Table 5.

TABLE 5

| Value | Description |
|---|---|
| 1 | Accept |
| 2 | Deny |
| 3 | Override |
| 4-255 | Reserved |

The element reason code field provides additional explanation to the station 12, when the status filed returns "deny" or "override". Values of the element reason code field is defined as indicated in Table 6.

TABLE 6

| Field value | Description |
|---|---|
| 1 | Denied due to malformed request or ambiguous classifier. |
| 2 | Denied due to lack of resources on AP. |
| 3 | Denied due to requested classifier(s) matching 2 or more existing streams on different intervals |
| 4 | Denied. By policy, requested stream is not permitted to participate in FBMS |
| 5 | Overridden due to existing stream with different delivery interval |
| 6 | Overridden due to policy limits on AP. |
| 7 | Overridden due to AP changed the delivery interval. |
| 8 | Overridden due to AP multicast rate policy |
| 9-255 | Reserved |

Referring again to Table 4, the delivery interval field defines the number of DTIMs at which the stream is transmitted, as defined by the access point 14.

The FBMSID field is assigned by the access point 14 and provides a unique identifier (ID) for this stream within the BSS. The FBMS counter ID is shown in Table 7.

TABLE 7

| | FBMS Counter ID | Current Count |
|---|---|---|
| Bits: | 3 | 5 |

The FBMS Counter ID in the FBMS counter provides a unique ID for the stream within the BSS. The current count field in the FBMS counter indicates how many DTIM beacons including the current beacon appear before the next DTIM after the broadcast/multicast frames assigned to this stream is transmitted.

In this time, the FBMS counter includes the FBMS counter ID of 3 bits and the current count of 5 bits. Accordingly, it is possible to recognize a start point of the FBMS counter.

The multicast rate field specifies the data rate to be used for the multicast service.

The multicast address field specifies a multicast MAC address for the multicast service.

The multicast diagnostic interval field specifies the number of beacon intervals for which the access point keeps multicast service traffic counts. The station uses the multicast diagnostic interval to determine how frequently to send multicast diagnostic reports.

FBMS Operation

Figure 5:
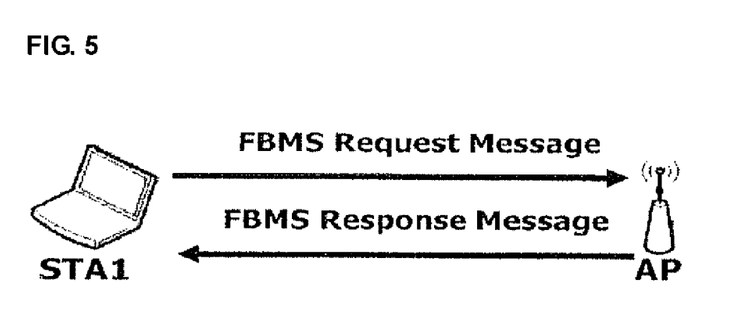
FIG. 5 is a flow chart illustrating processes of the wireless network system supporting the FBMS.

FIG. 5 is a flow chart illustrating processes of the wireless network system supporting the FBMS.

Referring to FIG. 5, in the wireless network system supporting the FBMS, the station (SAT1) transmits the FBMS request frame or message (FBMS Request Message) having all FBMS elements, for example, four FBMS elements, to the access point (AP), and the access point (AP) transmits the FBMS response frame or message (FBMS Response Message), thereby providing the FBMS. Using the FBMS request frame shown in Tables 1 and 2, the non-access point station 12 requests use of the FBMS by sending the FBMS request or reassociation request having all FBMS elements to be subscribed. This is a declaration of all streams in which the station 12 is interested. For each stream, the station 12 proposes a delivery interval for the requested FBMS element.

Using the FBMS response frame shown in Tables 3 to 6, the access point 14 may adopt the proposed delivery interval, and provide an alternate delivery interval for the stream.

A status value of "Accept" is transmitted by the access point 14 when the requested delivery interval is supported by the access point. A status value of "Deny" is transmitted by the access point when the access point denies the delivery interval requested by the station 12 and TCLAS completely. A status value of "Override" is transmitted by the access point 14 when the access point 14 denies the requested delivery interval, but can support an alternate delivery interval form the requested TCLAS. The station shall comply with the override value of the station 12. If the station 12 does not accept this overridden rate, then the station 12 shall send a new request with the TCLAS element removed.

The FBMS delivery interval is always an integer multiple of DTIM period or zero. If the access point 14 denies the usage of FBMS for a particular traffic stream, normal broadcast and multicast transmission rules are applied.

The access point 14 shall support up to eight different delivery intervals. Eight FBMS counters correspond to eight delivery intervals. Each counter decrements once per DTIM beacon and when the counter reaches "zero", the delivery interval expires. Upon expiry, the access point schedules for transmission of frames that exit in the broadcast/multicast streams assigned to each interval.

Meanwhile, the station 12 can indicate how many DTIM beacons appear before the next DTIM after the broadcast/multicast frames assigned to this stream are transmitted, through the current count included in the FBMS counter of the FBMS response frame shown in Tables 3 to 6. Accordingly, the station 12 does not need to wake up for indicating the start point of the FBMS counter, confirming AID 0 element during the next beacon interval, and receiving DTIM beacons sent from the access point 14.

In other words, the station 12 can indicate the start point through the current count of the FBMS counter. The station 12 wakes up when the delivery interval reaches "0" to receive the DTIM beacon, and conform whether the broadcast/multicast frame assigned to the corresponding stream is present.

Consequently, the station 12 negotiates the delivery interval with the access point 14 and indicates using the current count how many DTIM beacons are present before the next DTIM. Accordingly, the station 12 does not need to wake up for receiving the DTIM beacons including AID 0 descriptor element during next beacon interval before the next DTIM. Therefore, the station can minimize consumption power.

As describe above, upon request from the station 12, the access point 14 assigns a particular ID (FBMSID) to broadcast/multicast streams, negotiates the delivery interval and assigns a counter (FBMS counter ID) using the FBMS element.

The access point 14 uses AID 0 descriptor element in beacon frames to indicate the broadcast or multicast addresses where the buffered broadcast/multicast frames are targeted. This element is present only if the bit for AID 0 is set to 1.

The AID 0 descriptor element includes the FBMS counter ID of Table 7 and FBMS counter having the current count.

When receiving the FBMS request for the FBMS stream that has already assigned the particular delivery interval and the FBMS counter ID, the access point 14 can use the corresponding FBMS current counter to assign a transmission time of the FBMS streams already received by the station 12 instead of a transmission time of the stream. This is performed by enabling the access point 14 to change the current count. The current count can be uniquely changed only when same field values are maintained by two consecutive beacons where the current count appears. There does not specify an algorithm for enabling the access point to assign or offset selectively FBMS counters different from each other.

The access point 14 may update the delivery interval for the FBMSID by sending an unsolicited FBMS response to the appropriate address with updated delivery interval when the current count reaches zero.

The wireless network system and communication method thereof according to one embodiment of the present invention include the current count in an existing FBMS response frame without adding a particular field, and thus do not need to wake up for receiving the DTIM beacons including AID 0 element during the next beacon interval before next DTIM.

The embodiments of the present invention have been explained with reference to the drawing, but not limited thereto.

According to the embodiments of the present invention, a topology of the wireless network and connection process have been explained, but not limited thereto.

According to the embodiments of the present invention, the current count is included in the FBMS counter field, but not limited thereto. The current count may be included in other field except the FBMS counter field.

According to the embodiments of the present invention, the FMBS response including the current counter includes other fields except the current count. The embodiments of the present invention do not limit the range of the other fields. In other words, the other fields may be selectively included in the FBMS response.

According to the embodiments of the present invention, the current counter and FBMS counter ID of the FBMS counter field included in the FBMS response respectively use 3 bit and 5 bit, but the used bit may be different.

Therefore, the present invention can send and receive various information and data related to the broadcast or multicast service in the wireless network.

The embodiments of the present invention have been described for illustrative purposes, and those skilled in the art will appreciate that various modifications, additions and substitutions are possible without departing from the scope of the present invention should be defined by the appended claims and their legal equivalents.

What is claimed is:

1. A method of establishing a multicast service in a wireless communication system, the method comprising:
   receiving, by an access point, a request frame from a requesting station including a first delivery interval field indicating a delivery interval which is a period for transmission of a multicast stream in units of Delivery Traffic Indication Maps (DTIMs); and
   transmitting, by the access point, a response frame in response to the request frame in order to establish a multicast service, the response frame including an identification (ID) field, an element status field, a counter field directly following the ID field, and a rate field directly following the counter field, the ID field indicating a unique identifier for the multicast stream within a Basic Service Set (BSS), the element status field indicating an acceptance of the delivery interval for the multicast stream in the request frame, the rate field indicating a data rate to be used for the multicast service,
   wherein the counter field includes a counter ID field comprising three bits and a current count field comprising five bits, the counter ID field indicating an identifier for a counter assigned by the access point for the multicast stream, the current count field indicating a count which identifies a DTIM beacon after which the multicast stream assigned to the delivery interval is transmitted.

2. The method of claim 1, wherein the current count field indicates a specific number of DTIM Beacon frames which appear before a next DTIM Beacon frame after which the multicast stream assigned to the delivery interval is scheduled to be transmitted.

3. The method of claim 1, further comprising:
   transmitting, by the access point, the multicast stream to the requesting station at the delivery interval indicated by the delivery interval field of the request frame.

4. An access point for establishing a multicast service in a wireless communication system, the access point comprising:
   a means for receiving a request frame from a requesting station including a first delivery interval field indicating a delivery interval which is a period for transmission of a multicast stream in units of Delivery Traffic Indication Maps (DTIMs); and a means for transmitting a response frame to the requesting station in response to the request frame in order to establish a multicast service, the response frame including an identification (ID) field, an element status field, a counter field directly following the ID field, and a rate field directly following the counter field, the ID field indicating a unique identifier for the multicast stream within a Basic Service Set (BSS), the element status field indicating an acceptance of the delivery interval for the multicast stream in the request frame, the rate field indicating a data rate to be used for the multicast service, wherein the counter field includes a counter ID field comprising three bits and a current count field comprising five bits, the counter ID field indicating an identifier for a counter assigned by the access point for the multicast stream, the current count field indicating a count which identifies a DTIM beacon after which the multicast stream assigned to the delivery interval is transmitted.

5. The access point of claim 4, wherein the current count field indicates a specific number of DTIM Beacon frames which appear before a next DTIM Beacon frame after which the multicast stream assigned to the delivery interval is scheduled to be transmitted.

* * * * *